Feb. 7, 1967 F. L. LEMMONS 3,303,305
FLOW-RESPONSIVE SWITCH WITH AIR FOIL SHAPE
Filed Feb. 15, 1965
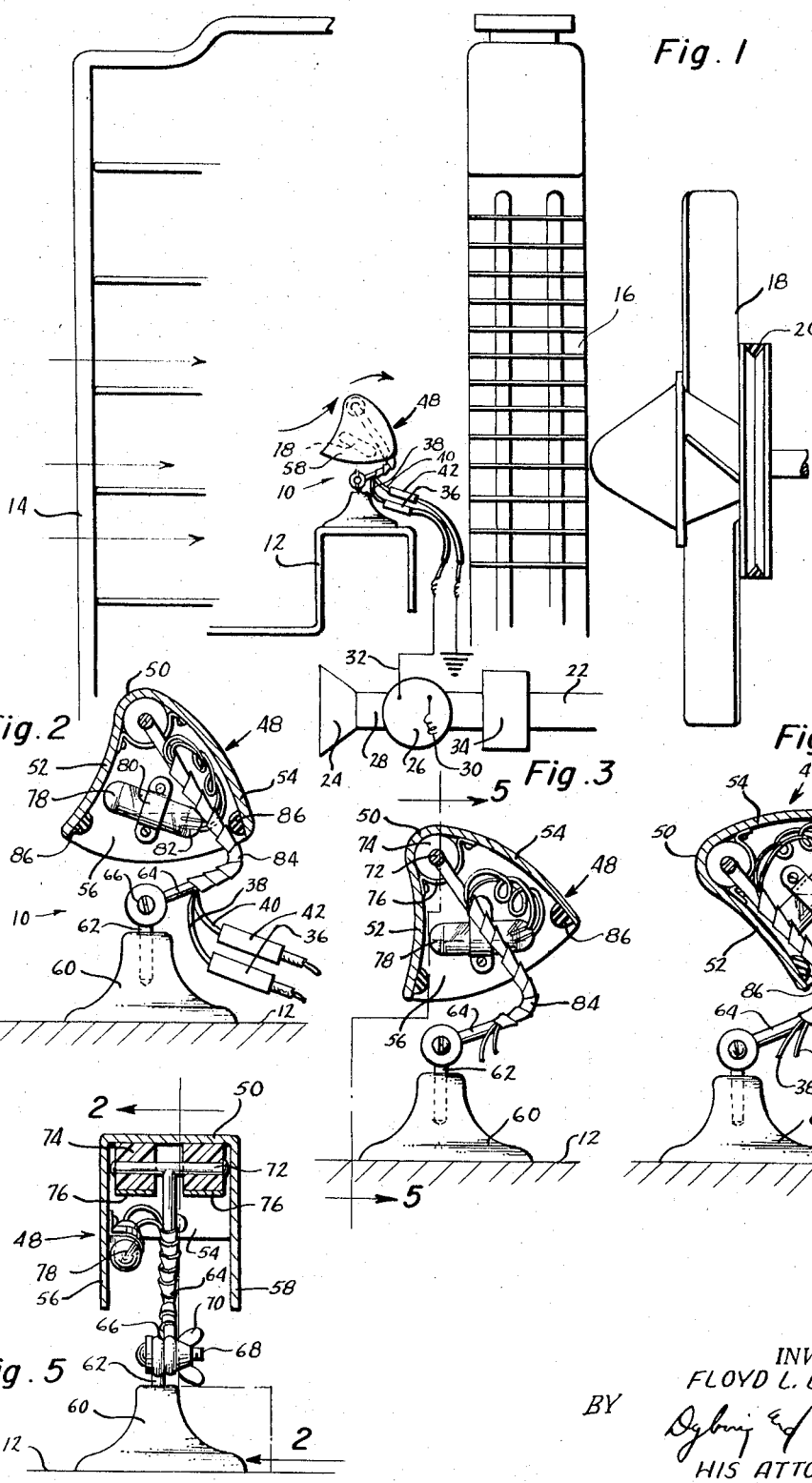
INVENTOR
FLOYD L. LEMMONS
BY
*Dybvig & Dybvig*
HIS ATTORNEYS United States Patent Office 3,303,305
Patented Feb. 7, 1967

3,303,305
FLOW-RESPONSIVE SWITCH WITH
AIR FOIL SHAPE
Floyd L. Lemmons, 148 Dutoit St.,
Dayton, Ohio 45402
Filed Feb. 15, 1965, Ser. No. 432,726
7 Claims. (Cl. 200—81.9)

This invention relates to a switch assembly and more particularly to an air responsive switch assembly usable for controlling a blower in a vehicle air freshening and heating system. However, as will become apparent from the following description, the invention is not necessarily so limited.

An object of this invention is to provide a simple, but reliable air responsive switch assembly.

A further object of this invention is to provide a novel control system for blowers located in air conduits of motor vehicles, such as automobiles or the like.

Other objects and advantages will become apparent from the following description.

Referring to the drawings:

FIGURE 1 is a side view of a switch assembly made in accordance with this invention installed in a motor vehicle. In FIGURE 1, portions of the vehicle are shown in diagrammatic form.

FIGURE 2 is a vertical cross-sectional view of the switch assembly shown in FIGURE 1, taken along the line 2—2 of FIGURE 5.

FIGURE 3 is a vertical sectional view similar to FIGURE 2, illustrating some of the parts in a different position.

FIGURE 4 is a vertical sectional view similar to FIGURES 2 and 3 and illustrating some of the parts in still another position.

FIGURE 5 is a vertical sectional view of the switch assembly taken along line 5—5 of FIGURE 3.

Referring to FIGURE 1, an air operated switch assembly generally designated 10 and made in accordance with this invention is illustrated as mounted on a frame member or other suitable cross support member 12 of a motor vehicle immediately behind the grill portion 14 thereof and in front of a radiator 16. As is well known, air passing through open sections of the grill 14, indicated by the arrows in FIGURE 1, is drawn through the radiator 16 by a fan 18 which may be driven by a fan belt 20 off the motor crank shaft (not shown).

Also illustrated in FIGURE 1 is an air conduit 22 having an air intake section 24 which normally would be located in or near the grill 14. A blower 26 located in a forward section 28 of the conduit 22 is adapted to increase the volume of air flowing into the conduit 22. The blower 26 includes an electric motor connected by a power terminal 30 to the battery of other electrical energy source within the vehicle and by a ground terminal 32 to ground. For use during cold weather, a heating element, diagrammatically illustrated at 34, also located in the conduit 22, may be connected to an electrical energy source through suitable circuiting. The ground terminal 32 is shown connected by a first terminal plug 36 to a first switch wire 38. A second switch wire 40 is shown connected through a second terminal plug 42 to ground. As will become more apparent, the switch assembly 10 is designed to open or close the circuit between the first and second switch wires 38 and 40, thereby controlling the operation of the blower 26.

The blower 26, which may or may not be separately controlled by a switch in the passenger compartment (not shown) of the automobile, is used during warmer weather to draw fresh air into the passenger compartment while the vehicle is at rest or traveling at low speeds. The blower 26 is similarly required during colder weather, in which case the heating element 34 would be energized. When the vehicle is traveling at high speeds, however, the blower 26 is unnecessary. Often there is an undesirably high air flow into the passenger compartment when the vehicle is traveling at fast speeds, in part caused by the continued operation of the blower 26. In accordance with this invention, when the vehicle is traveling at approximately forty miles an hour, an open circuit condition is created across the terminal plugs 36 and 42 to deenergize the blower motor. Of course, the precise vehicle speed at which the blower will be deenergized depends upon a variety of factors, such as the prevailing wind direction and speed, and the density of the air. The switch assembly 10 is located between the vehicle grill 14 and the radiator 16 because the ram air entering through the slots in the grill 14 closely approximates the same conditions encountered at the face of the intake section 24 of the conduit 22. The switch assembly 10 is designed to be operated by the ram air as will now be described.

The switch assembly 10 includes an open-bottom housing 48 formed from a generally U-shaped strip of material having a bight end 50, a front leg 52 and a rear leg 54. The housing 48 further includes parallel sidewalls 56 and 58 connected to the side edges of the front and rear legs 52 and 54 and coextensive with the openings therebetween. The housing 48 is mounted on a support assembly including a support pin 62 extending into a mounting bracket 60, a support arm 64 and a pivot assembly 66 connecting the pin 62 to the arm 64. As shown in FIGURE 5, the pivot assembly 66 may include enlarged ends of the pin 62 and the arm 64 shaped as eyelets to receive a screw 68. A wing nut 70 threadedly engaging the screw 68 clamps the arm 64 to the pin 62 at a predetermined angle. The mounting bracket 60, as illustrated, may be a vacuum cup or any other suitable bracket which can be fixedly secured to the support member 12.

The upper end of the arm 64 is connected to the center of a pivot pin 72 projecting at right angles thereto and located in bushings 74 made of nylon or the like clamped to the inner face of the bight end 50 by clamping straps 76 having ends secured to the inner faces of the front and rear legs 52 and 54, respectively. A gravity operated switch member 78 is strapped to the inner face of the sidewall 56 by a clamping strap 80. The switch member 78 illustrated is a mercury switch comprising a glass tube partially filled with mercury and having a pair of switch contacts 82 therein connected respectively to the switch wires 38 and 40. The switch wires 38 and 40 may conveniently be wrapped around the support arm 64 and secured thereto as by a strip of adhesive tape 84.

In operation, the switch housing is in its rest position shown in FIGURES 1 and 2 when the flow of air advancing relatively toward the front face of the front leg 52 is insufficient to pivot the housing 48 about the pivot pin 72. Such would be the case when the switch assembly 10 is mounted on a vehicle at rest or traveling at low speeds. As illustrated in FIGURE 2, the pool of mercury within the switch member 78 engages both switch contacts 82 whereupon there is a closed circuit condition between the wires 38 and 40; the motor for the blower 26 is, therefore, connected to ground and is operating. As the flow of air advancing towards the front leg 52 increases, it exerts pressure on the front face of the housing 48, causing it to pivot in a counter-clockwise direction, as viewed in FIGURES 2, 3 and 4, about the pin 72 from that position shown in FIGURE 2 to that shown in FIGURE 3, and ultimately to that position shown in FIGURE 4. The pool of mercury within the switch member 78 engages only one of the switch contacts 82 when the housing 48 reaches the FIGURE 3 position. There is thus an open circuit condition between the switch wires 38 and 40. Accordingly, the motor for the blower 26, no longer connected to ground, is deenergized.

The support arm 64, the front leg 52 and the rear leg 54 of the switch assembly 10 have been designed to provide maximum stability of the switch asembly, both when at rest and when pivoted about the pin 72 into that position shown in FIGURE 4. The support arm 64 is bent so that the portion thereof passing through the opening at the bottom of the housing 48 extends at an angle to the vertical and engages the inner face of the rear leg 54, thus supporting the housing 48 in a position in which its center of gravity, including the center of gravity of the switch member 78, is located to the rear of the vertical plane passing through the center of the pivot pin 72. The rear leg of the housing 48 thus will firmly engage the arm 64 and remain substantially in the position shown in FIGURE 2 because the housing 48 tends to pivot in a clockwise direction, as viewed in FIGURE 2. This tendency of the housing 48 to pivot in a clockwise direction decreases the likelihood that the switch contacts 82 will be accidently open circuited due to vibration.

In practice, the switch housing 48 normally remaining in substantially the rest position shown in FIGURE 2 until the ram air advancing relative to the front face of the housing 48 is sufficient to pivot it to that position shown in FIGURE 3. The housing then immediately pivots to its extreme pivotal position shown in FIGURE 4. The immediate, almost snap action, pivotal movement of the housing 48 from the rest position of FIGURE 2 into that position shown in FIGURE 4 is believed primarily due to the shape of the front and rear legs 52 and 54. The front leg 52 extends concavely inwardly and downwardly from the bight end 50 and acts as an air scoop. Because convex, it presents the greatest area to the oncoming ram air shortly after the housing 48 begins to pivot in a counterclockwise direction, substantially in that position shown in FIGURE 3. Thus, the effective wind resisting area of the front face of the leg 52 is at its greatest after the ram air has overcome the inertia of the housing 48.

As the housing 48 pivots in a counterclockwise direction from that position shown in FIGURE 3 to that shown in FIGURE 4, an air foil effect occurs due to the shape of the rear leg 54, which extends convexly outwardly and downwardly from the bight end 50. The air flow over the curved outer surface of the rear leg 54, when the housing 48 is in that position shown in FIGURE 4, tends to create a vacuum above the housing 48, causing an upward pressure to be exerted thereon, aiding the rearward ram air pressure exerted on the front face of the front leg 52 at the same time. Another factor leading to rapid operation of the switch assembly 10 involves the position and orientation of the switch member 78. As may be noted in FIGURE 2, the entire weight of the switch member 78 is forwardly of the housing 10, and that the pool of mercury therein is at a maximum distance from the pivot pin 72. During pivotal movement of the housing 48, the pool of mercury shifts toward the pivot pin 72, thereby shifting its center of gravity toward the pivot pin 72. Accordingly, less force will be required to continue pivotal movement of the housing 48.

The rapid pivotal movement of the housing 48 from the rest position to the FIGURE 4 position is advantageous since the gravity operated switch 78 moves from one extreme position to the other extreme position and does not hover about an intermediate position which would cause repeated opening and closing of the switch contacts 82. To minimize the shock to the switch assembly 10 resulting from the rapid pivotal movement of the housing 48, the confronting surfaces of the front and rear legs 52 and 54 are provided with resilient bumper elements 86.

The switch housing 48 may be made from thin sheet metal or the like and is relatively light-weight. The air flow required to operate the switch assembly 10 depends upon a variety of factors, including the weight of the housing, the width of the U-shaped strip, which, of course, directly affects the area presented by the front face of the leg 52 to the ram air. Further, the switch assembly 10 can be adjusted to a limited extent to operate on a greater or lesser amount of air flow by appropriately adjusting the angle relative to the vertical of the portion of the arm 64 passing into the housing 48. This adjustment can be effected by loosening the wing nut 70 and rotating the arm 64 relative to the pin 62. If the arm 64 were rotated in a clockwise direction from that position viewed in FIGURE 2, the ram air advancing relatively towards the front face of the leg 52 would have to be greater in order to move the housing 48 into that position shown in FIGURE 3, at which time the contacts 82 are open circuited. Similarly, by rotating the arm 64 in a counterclockwise direction from that shown in FIGURE 2, the housing 48 would be pivoted more toward the position, relative to the support 12, shown in FIGURE 3 and a lesser air flow would be required. These adjustments are limited to the tolerable pivotal movement of the housing 48, such that it remains engaged with the arm 64 when at rest, and the tolerable pivotal movement of the switch member 78, such that it remains in a tilted position at rest. It may also be noted that the characteristics of the switch assembly 10 can be adjusted by pivotal movement of the switch member 78, which necessarily must initially be at an angle to the horizontal. All of the adjustments mentioned above can be used to vary the response of the switch assembly. In addition, adjustment of the arm 64 is of importance when horizontal surfaces, such as the illustrated support 12, are unavailable.

Although the presently preferred embodiment of the device has been described, it will be understood that within the purview of this invention various changes may be made in the form, details, proportion and arrangements of parts, the combination thereof and mode of operation, which generally stated consists in a device capable of carrying out the objects set forth, as disclosed and defined in the appended claims.

Having thus described my invention I claim:

1. An air operated switch assembly responsive to flow of air relative thereto comprising: support means including a support member; a wind vane including a generally U-shaped strip inverted upon said support member and mounted for pivotal movement thereon about an axis passing between the legs of said U-shaped strip adjacent the bight end thereof whereby pivotal movement of said wind vane about said axis is limited by engagement of said legs with said support member, one of said legs being adapted to be positioned with the path of air flowing relatively theretoward, the other of said legs extending convexly outwardly and downwardly from said bight end to provide an air foil effect when the flow of air advancing relatively toward said one of said legs causes said one of said legs to engage said support member; and a switch member supported by said support means, said switch member having switch contacts which are open circuited and close circuited in response to pivotal movement of said wind vane.

2. The structure of claim 1 further comprising sidewalls connected to the side edges of said legs to form an open-bottom housing and wherein said switch member comprises a mercury switch mounted on the internal face of one of said sidewalls.

3. An air actuated switch assembly comprising: a support member, a wind vane including a generally U-shaped strip having front and rear legs connected at a bight end portion and inverted upon said support member for pivotal movement about a substantially horizontal axis passing between said legs adjacent said bight end, said rear leg extending convexly outwardly and downwardly from said bight end to provide an air foil effect when air advancing relatively toward said front leg causes said front leg to engage said support member, and a switch member supported by said support member responsive to pivotal movement of said U-shaped strip about said axis.

4. The structure of claim 3 wherein said support member includes a support arm passing through the open end of said U-shaped strip between said legs, whereby pivotal movement of said vane about said axis is limited by engagement of said legs with said support arm, said arm extending at an angle to the vertical plane containing said pivot axis and engaging said rear leg when said vane is in a rest position wherein the center of gravity of said vane is offset from a vertical line passing through said pivot axis.

5. The structure of claim 4 wherein said support member further includes means pivotally mounting said support arm whereby the angle of said arm relative to vertical can be adjusted.

6. The structure of claim 3 wherein said front leg extends concavely outwardly and downwardly from said bight end to increase the effective air engaging surface thereof as said vane is pivoting about said axis.

7. The structure of claim 4 further comprising sidewalls connected to the side edges of said legs to form an open-bottom housing and wherein said switch member is a gravity operated switch mounted on the internal face of one of said sidewalls.

References Cited by the Examiner
UNITED STATES PATENTS

| | | | |
|---|---|---|---|
| 414,883 | 11/1889 | Harrison | 200—81.9 X |
| 852,979 | 5/1907 | Rice | 200—81.9 X |
| 1,984,054 | 12/1934 | Carraway | 200—81.9 X |
| 3,193,640 | 7/1965 | Mineck | 200—81.9 |

BERNARD A. GILHEANY, *Primary Examiner.*

H. M. FLECK, G. J. MAIER, *Assistant Examiners.*